(12) United States Patent
Yang et al.

(10) Patent No.: US 12,413,268 B2
(45) Date of Patent: Sep. 9, 2025

(54) METHOD FOR REFLECTIVE INDEX MODULATION BASED ON INTELLIGENT REFLECTING SURFACE

(71) Applicant: UNIVERSITY OF ELECTRONIC SCIENCE AND TECHNOLOGY OF CHINA, Sichuan (CN)

(72) Inventors: Kun Yang, Chengdu (CN); Yizhe Zhao, Chengdu (CN); Long Zhang, Chengdu (CN); Jie Hu, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 32 days.

(21) Appl. No.: 18/634,170

(22) Filed: Apr. 12, 2024

(65) Prior Publication Data

US 2024/0267088 A1    Aug. 8, 2024

(30) Foreign Application Priority Data

Apr. 21, 2023   (CN) .......................... 202310438362.8

(51) Int. Cl.
*H04B 7/04*        (2017.01)
*H04L 27/36*       (2006.01)

(52) U.S. Cl.
CPC ......... *H04B 7/04013* (2023.05); *H04L 27/36* (2013.01)

(58) Field of Classification Search
CPC .... H04B 7/04013; H04L 27/36; Y02D 30/70; H04W 72/0453; H04W 72/535

(Continued)

(56) References Cited

U.S. PATENT DOCUMENTS

2022/0416933 A1* 12/2022 Nam ...................... H04B 17/40
2023/0261376 A1*  8/2023 Choi .................. H04B 7/04013
                                                                342/367

(Continued)

OTHER PUBLICATIONS

Kai, Caihong et al.; "Max-Min Fairness in IRS-Aided MISO Broadcast Channel via Joint Transmit and Reflective Beamforming"; GLOBECOM 2020—2020 IEEE Global Communications Conference; 2020; pp. 1-6.

(Continued)

*Primary Examiner* — Emmanuel Bayard
(74) *Attorney, Agent, or Firm* — Oliff PLC (57) ABSTRACT

A method for reflective index modulation based on intelligent reflecting surface, in which an IRS control unit is added into wireless communication system, and the data to be transmitted in a transmission is divided into two parts: a reflective domain data $d_r$ and a phase-amplitude domain data $d_c$, the reflective domain data $d_r$ is transmitted through a wired connection to the IRS control unit to activate or deactivate each group of reflecting elements, the phase-amplitude domain data $d_c$ is modulated through traditional phase-amplitude domain modulation and transmitted to the IRS, the reflected signals contain the information of the reflective domain data $d_r$, through the demodulating the baseband symbol $y_{\overline{m},\overline{j}}$, an estimated phase-amplitude modulation index $\overline{m}$ and an estimated reflective index $\overline{j}$ are obtained to recover the phase-amplitude domain data $d_c$ and the value of the reflective domain data $d_r$ respectively.

2 Claims, 3 Drawing Sheets

(58) Field of Classification Search
USPC .................................. 375/219, 262, 267
See application file for complete search history.

(56) References Cited

U.S. PATENT DOCUMENTS

2023/0318177 A1* 10/2023 Zhou .................. H04L 25/0204
                                                                         455/456.1
2023/0370958 A1* 11/2023 Gunzelmann ......... H04W 36/06
2024/0413868 A1* 12/2024 Haghighat .......... H04L 25/0204

OTHER PUBLICATIONS

Guo, Shuaishuai et al.; "Reflecting Modulation"; IEEE Journal on Selected Areas in Communications; vol. 38; No. 11; Nov. 2020; pp. 2548-2561.
Zhao, Yizhe et al.; "Receive Spatial Modulation Aided Simultaneous Wireless Information and Power Transfer With Finite Alphabet"; IEEE Transactions on Wireless Communications; vol. 19; No. 12; Dec. 2020; pp. 8039-8053.

\* cited by examiner

METHOD FOR REFLECTIVE INDEX MODULATION BASED ON INTELLIGENT REFLECTING SURFACE

FIELD OF THE INVENTION

This application claims priorities under the Paris Convention to Chinese Patent Application No. 202310438362.8, filed on Apr. 21, 2023, the entirety of which is hereby incorporated by reference for all purposes as if fully set forth herein.

The present invention relates to the field of wireless modulation, more particularly to a method for reflective index modulation based on intelligent reflecting surface.

BACKGROUND OF THE INVENTION

In the era of 6G wireless communication, more and more wireless devices are swarming into the modern cities, which poses a challenge to the spectrum efficiency of wireless communication network. Due to limited communication resources, the swarming of mass wireless devices results in a more crowded network, where the interferences among network users are becoming more serious, and the qualities of service (QOS) of the wireless communication, such as throughput and latency performance, are consequently degraded. Moreover, due to the rapid development of modern cities, buildings are becoming more and more dense. Hence, there are rarely line-of-sight (LOS) wireless communication links between base station (BS) and wireless devices. The inevitable channel fading will seriously degrade the communication efficiency of the network.

Intelligent reflecting surface (IRS) has been studied for many years by lots of scholars, and is considered as a promising technology in 6G wireless communication. An IRS is comprised of many reflecting elements, each reflecting element can reflect wireless signals with an adjustable phase shift. With the assistance of IRS, the abovementioned problem can be readily relieved. For instance, an IRS can be deployed on the wall of a building, which may eliminate blind spots and provide direct communication links between base station and wireless devices. IRS can also approximately adjust the reflecting phase shift to reshape the received signal at the receiver and reduce the interference caused by other wireless devices.

Apart from the assistance of IRS, index modulation is another approach to improve the spectrum efficiency. With the assistance of index modulation, additional information can be carried by activating different indices of the communication resources, such as antennas, time slots and carriers.

How to apply index modulation to IRS-assisted wireless communication system to further improve the spectrum efficiency is a key problem to solve in the prior art.

SUMMARY OF THE INVENTION

The present invention aims to solve the problem in the prior art and provides a method for reflective index modulation based on intelligent reflecting surface, so as to apply index modulation to IRS-assisted wireless communication system to further improve the spectrum efficiency.

To achieve this objective, in accordance with the present invention, a method for reflective index modulation based on intelligent reflecting surface (hereinafter referred by IRS) is provided, comprising the following steps:

(1) creating an IRS-assisted wireless communication system, wherein the IRS-assisted wireless communication system comprises a transmitter, a receiver, an IRS and an IRS control unit, the transmitter is equipped with $N_t$ antennas, the receiver is equipped with a single antenna due to the limitation of its hardware size, the IRS comprises $N_s$ reflecting elements, and the $N_s$ reflecting elements are divided into L groups, $L \leq \log_2 N_s$, each group has $N_s/L$ reflecting elements, each reflecting element can modify the phase of received wireless signal and can be switched between active state and inactive state by the IRS control unit:

(2) transmitting data through reflective index modulation:

2.1) dividing the data to be transmitted in a transmission into two parts: a reflective domain data $d_r$ and a phase-amplitude domain data $d_c$, then transmitting the reflective domain data $d_r$ to the IRS control unit through a wired connection by the transmitter;

2.2) performing a reflective domain modulation by the IRS control unit: converting the received reflective domain data $d_r$ into a reflective index j by using Gray mapping rule, where $1 \leq j \leq L$ and j corresponds to the value of the reflective domain data $d_r$, then denoting the j-th IRS activating pattern as an indicator $a_j = [a_{j,1}, a_{j,2}, \ldots, a_{j,L}]$, where $a_{j,l}=1$, when $1 \leq l \leq j$, $a_{j,l}=0$, when $j < l \leq L$, then activating or deactivating each group of reflecting elements according to the value of $a_{j,l}$: if $a_{j,l}=1$, then activating the l-th group of reflecting elements to turn them into active state, if $a_{j,l}=0$, then deactivating the group l-th of reflecting elements to turn them into inactive state;

2.3) performing a phase-amplitude domain modulation for the phase-amplitude domain data $d_c$ by the transmitter to obtain a modulated baseband symbol $b_m$, where m is a phase-amplitude modulation index and corresponds to the value of the phase-amplitude domain data $d_c$, then upconverting the modulated baseband symbol $b_m$ into a wireless signal and transmitting the wireless signal to the IRS through the $N_t$ antennas of the transmitter;

2.4) receiving the wireless signals sent from the $N_t$ antennas, modifying the phase of the received wireless signals and reflecting their received wireless signals to the receiver by the active reflecting elements of the IRS respectively;

2.5) receiving the wireless signals reflected by the active reflecting elements of the IRS through the receiver, converting the received wireless signals to baseband to obtain a received baseband symbol $y_{m,j}$;

2.6) demodulating the baseband symbol $y_{m,j}$ in phase-amplitude domain and reflective domain: finding a trial index m' in the set of $[1, 2, \ldots, M]$ and a trial index j' in the set of $[1, 2, \ldots, L]$ to make $|y_{m,j} - g_{j'} b_{m'}|^2$ minimal and taking the trial index m' as an estimated phase-amplitude modulation index $\bar{m}$ and the trial index j' as is an estimated reflective index $\bar{j}$, where the demodulation process is expressed as:

$$(\bar{m}, \bar{j}) = \arg \min_{\substack{m' \in [1,2,\ldots,M] \\ j' \in [1,2,\ldots,L]}} \left( |y_{m,j} - g_{j'} b_{m'}|^2 \right)$$

where M is the modulation order of the phase-amplitude domain modulation, $g_{j'}$ is the channel gain under the j'-th IRS activating pattern, which can be obtained by channel estimation, $b_{m'}$ is the modulated baseband symbol of phase-amplitude modulation index m';

2.7) recovering the value of the reflective domain data $d_r$ according to the estimated reflective index $\hat{j}$ and the value of the phase-amplitude domain data $d_c$ according to the estimated phase-amplitude modulation index $\hat{m}$ to recover the transmitted data.

The objective of the present invention is realized as follows:

In accordance with the present invention, a method for reflective index modulation based on intelligent reflecting surface is provided, in which an IRS control unit is added into wireless communication system, and the data to be transmitted in a transmission is divided into two parts: a reflective domain data $d_r$ and a phase-amplitude domain data $d_c$, the reflective domain data d is transmitted through a wired connection to the IRS control unit to activate or deactivate each group of reflecting elements, the phase-amplitude domain data $d_c$ is modulated through traditional phase-amplitude domain modulation and transmitted to the IRS, the reflected signals contain the information of the reflective domain data $d_r$, through the demodulating the baseband symbol $y_{m,j}$, an estimated phase-amplitude modulation index m and an estimated reflective index $\hat{j}$ are obtained to recover the phase-amplitude domain data $d_c$ and the value of the reflective domain data $d_r$ respectively. The present invention transmits some data through activating or deactivating each group of reflecting elements by additional reflective index, more data can be transmitted in one transmission, therefore the spectrum efficiency is improved.

BRIEF DESCRIPTION OF THE DRAWING

The above and other objectives, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. It should be noted that the similar modules are designated by similar reference numerals although they are illustrated in different drawings. Also, in the following description, a detailed description of known functions and configurations incorporated herein will be omitted when it may obscure the subject matter of the present invention.

Figure 1:
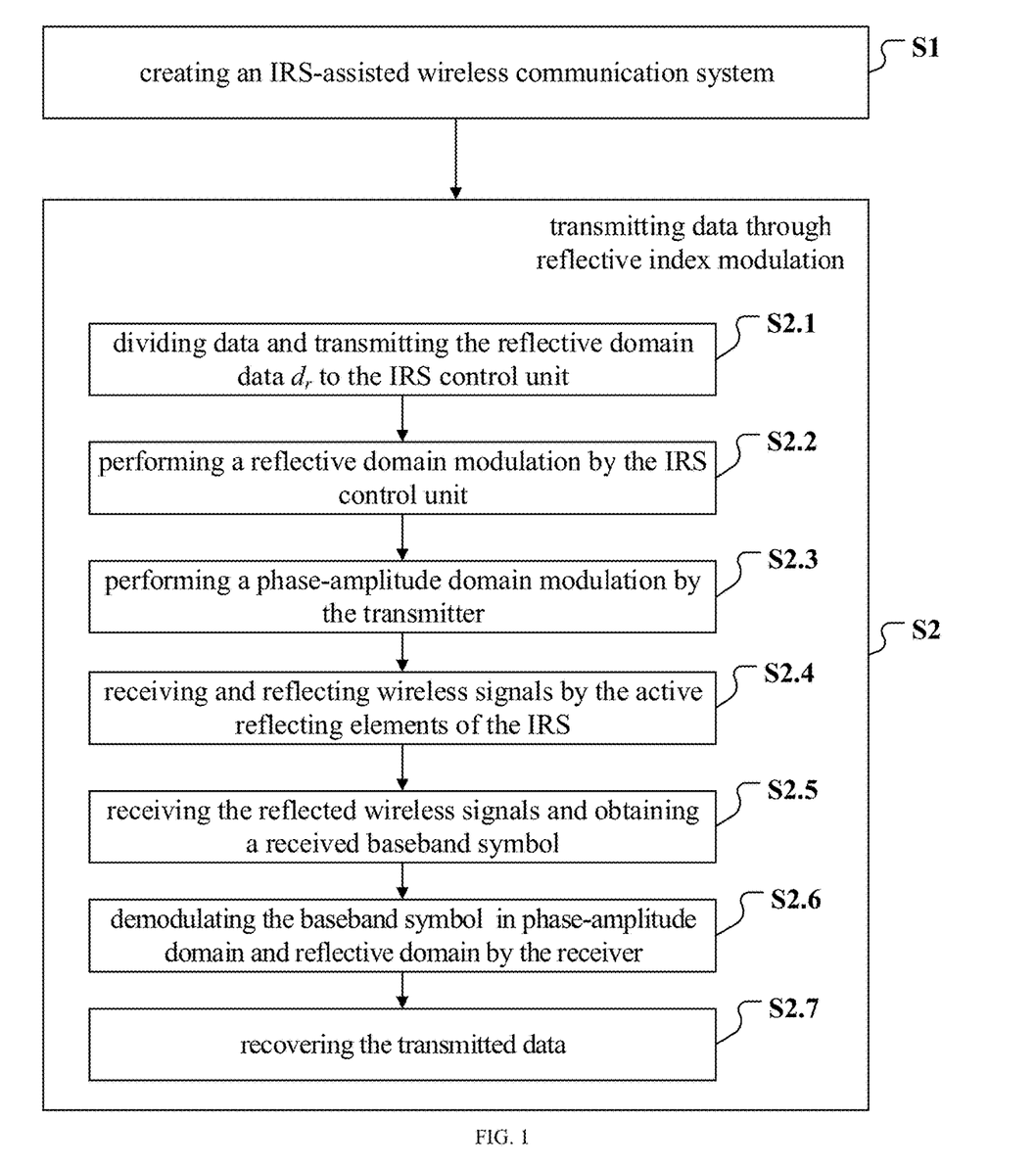
FIG. 1 is a flowchart of a method for reflective index modulation based on intelligent reflecting surface according to one embodiment of the present invention.

In one embodiment, as shown in FIG. 1, the present invention provides a method for reflective index modulation based on intelligent reflecting surface (hereinafter referred by IRS), which comprises the following steps:

Step S1: Creating an IRS-Assisted Wireless Communication System

Figure 2:
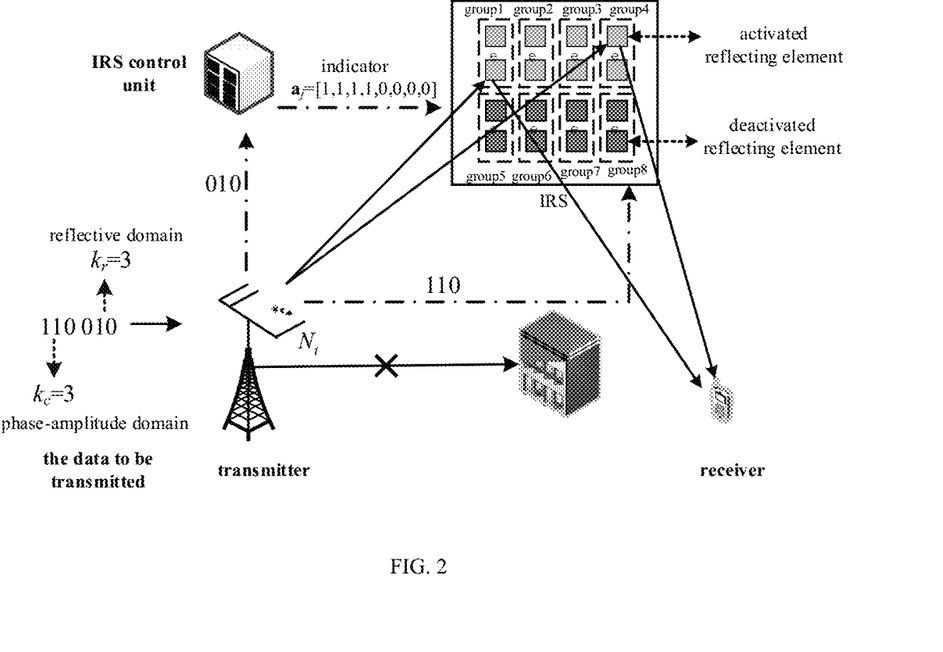
FIG. 2 is a diagram of a method for reflective index modulation based on intelligent reflecting surface according to one embodiment of the present invention.

As shown in FIG. 2, the IRS-assisted wireless communication system is a multiple input single output (MISO) system, which comprises a transmitter, a receiver and an IRS. To realize a reflective domain modulation, the IRS control unit is added into the MISO system to create the IRS-assisted wireless communication system. Wherein the transmitter is equipped with $N_t$ antennas, the receiver is equipped with a single antenna due to the limitation of its hardware size, the IRS comprises $N_s$ reflecting elements, and the $N_s$ reflecting elements are divided into L groups, $L \leq \log_2 N_s$, each group has $N_s/L$ reflecting elements, each reflecting element can modify the phase of received wireless signal and can be switched between active state and inactive state by the IRS control unit. In the inactive state, the element would not reflect wireless signals. It's assumed that the direct communication link between the transmitter and the receiver does not exist, namely there is no line-of-sight (LOS) channel from the transmitter to the receiver due to the shelter of buildings or trees.

The block fading channels are assumed between the transmitter and the IRS as well as between the IRS and the receiver, which are not changed in one symbol. The channel state information (CSI) between the transmitter and the IRS is denoted as $H_{ts} \in \mathbb{C}^{N_s \times N_t}$, The CSI between the IRS and the receiver is denoted as $h_{sr} \in \mathbb{C}^{1 \times N_s}$, $\mathbb{C}$ denotes the set of complex numbers. Assuming that CSI $H_{ts}$ is perfect and CSI $h_{sr}$ is imperfect, CSI $h_{sr}$ can be expressed as:

$$h_{sr} = \rho \hat{h}_{sr} + \sqrt{1-\rho^2} \Delta h \quad (1)$$

where $\rho$ is a channel estimation accuracy parameter, $\hat{h}_{sr}$ represents the estimated CSI between the IRS and the receiver, $\Delta h$ represents the channel estimation error, which is independent with the estimated CSI $\hat{h}_{sr}$. The elements in $\Delta h$ are independent with each other and are Gaussian distributed having the variance of $\sigma_h^2 = d_{sr}^{-\alpha}$, where $d_{sr}$ is the distance between the IRS and the receiver and a is the pathloss exponent. Note that when $\rho=1$, $h_{sr}$ is perfectly estimated. The IRS phase shifter matrix is denoted as:

$$\Phi = \begin{bmatrix} \beta_1 e^{j\theta_1} & 0 & \cdots & 0 \\ 0 & \beta_2 e^{j\theta_2} & \cdots & 0 \\ \vdots & \vdots & \ddots & \vdots \\ 0 & 0 & \cdots & \beta_{N_s} e^{j\theta_{N_s}} \end{bmatrix} \quad (2)$$

where $\beta_l$, $\theta_l$ are the magnitude reflection coefficient and the phase shift of the l-th IRS reflecting element, respectively. To maximumly reflect the incoming signal, the magnitude reflection coefficients $\beta_1 = \beta_2 = \ldots = \beta_{N_s} = 1$.

Step S2: Transmitting Data Through Reflective Index Modulation

Step S2.1: Dividing Data and Transmitting the Reflective Domain Data $d_r$ to the IRS Control Unit Dividing the data to be transmitted in a transmission into two parts: a reflective domain data $d_r$ and a phase-amplitude domain data $d_c$, then transmitting the reflective domain data $d_r$ to the IRS control unit through a wired connection by the transmitter.

Step S2.2: Performing a Reflective Domain Modulation by the IRS Control Unit

Converting the received reflective domain data $d_r$ into a reflective index j, where $1 \leq j \leq L$ and j corresponds to the value of the reflective domain data $d_r$, then denoting the j-th IRS activating pattern as an indicator $a_j=[a_{j,1}, a_{j,2}, \ldots, a_{j,L}]$, where $a_{j,l}=1$, when $1 \leq l \leq j$, $a_{j,l}=0$, when $j<l\geq L$, then activating or deactivating each group of reflecting elements according to the value of $a_{j,l}$: if $a_{j,l}=1$, then activating the l-th group of reflecting elements to turn them into active state, if $a_{j,l}=0$, then deactivating the l-th group of reflecting elements to turn them into inactive state.

The reflective domain modulation can be named as L-RGNIM (L-Reflective Group Number based Index Modulation). The IRS has L IRS activating patterns and the reflective domain data $d_r$ in the reflective domain is carried by activating different groups of reflecting elements, the $k_r = \log_2 L$ bits can be transmitted in each transmission.

The conventional Gray mapping rule is used to map the received reflective domain data $d_r$ into an indicator $a_j$.

TABLE 1

| received reflective domain data $d_r$ | reflective index j | indicator $a_j$ | activated groups of reflecting elements |
|---|---|---|---|
| 000 | 1 | [1, 0, 0, 0, 0, 0, 0, 0] | 1 |
| 001 | 2 | [1, 1, 0, 0, 0, 0, 0, 0] | 2 |
| 011 | 3 | [1, 1, 1, 0, 0, 0, 0, 0] | 3 |
| 010 | 4 | [1, 1, 1, 1, 0, 0, 0, 0] | 4 |
| 110 | 5 | [1, 1, 1, 1, 1, 0, 0, 0] | 5 |
| 111 | 6 | [1, 1, 1, 1, 1, 1, 0, 0] | 6 |
| 101 | 7 | [1, 1, 1, 1, 1, 1, 1, 0] | 7 |
| 100 | 8 | [1, 1, 1, 1, 1, 1, 1, 1] | 8 |

Table 1 shows a modulation principle of 8-RGNIM. When L=8, 3 bits can be transmitted in each transmission.

Step S2.3: Performing a Phase-Amplitude Domain Modulation by the Transmitter

For the phase-amplitude domain data $d_c$, performing a phase-amplitude domain modulation to obtain a modulated baseband symbol $b_m$, where m is a phase-amplitude modulation index and corresponds to the value of the phase-amplitude domain data $d_c$, then upconverting the modulated baseband symbol $b_m$ into a wireless signal and transmitting the wireless signal to the IRS through the $N_t$ antennas of the transmitter.

The phase-amplitude domain modulation can be traditional modulation, such as M-QAM (Quadrature Amplitude Modulation) and M-PSK (Phase-Shift Keying). When the modulation order of the phase-amplitude domain modulation is M, the $k_c = \log_2 M$ bits can be transmitted in each transmission. When M=8, 3 bits can be transmitted in each transmission.

By jointly exploiting the reflective domain modulation and the phase-amplitude domain modulation, $k=k_r+k_c$ bits can be transmitted in each transmission. In the embodiment, 6 bits can be transmitted in each transmission.

Without loss of generality, in the embodiment, M-QAM is adopted in the phase-amplitude domain modulation. The modulated baseband symbol $b_m$, m=1, 2, ... M can be expressed as $b_m = A_{I,m} + jA_{Q,m}$, where $A_{I,m}$ and $A_{Q,m}$ are the in-phase and quadrature amplitude of $b_m$, respectively. Given the average transmit power $P_s$, the amplitude set of $A_{I,m}$ and $A_{Q,m}$ is expressed as:

$$(A_{I,m}, A_{Q,m}) \in \sqrt{\frac{3P_s}{2(M-1)}} \{1-\sqrt{M}, 3-\sqrt{M}, \ldots, \sqrt{M}-3, \sqrt{M}-1\} \quad (3)$$

While the minimum Euclidean distance between the constellation point is:

$$\xi = 2\sqrt{\frac{3P_s}{2(M-1)}} \quad (4)$$

When the modulated baseband symbol $b_m$ is transmitted and the indicator $a_j$ of the j-th IRS activating pattern works, the joint modulated symbol by considering M-QAM and L-RGNIM can be expressed as $s_{m,j}$. In the j-th IRS activating pattern, only the first j groups of reflecting elements are activated, the corresponding IRS phase shifter matrix $\Phi_j$ can be expressed as:

$$\Phi_j = \Phi \begin{bmatrix} I_{jN_l \times jN_l} & 0_{jN_l \times (L-j)N_l} \\ 0_{jN_l \times (L-j)N_l} & 0_{(L-j)N_l \times (L-j)N_l} \end{bmatrix} = \Phi A_j \quad (5)$$

Where $I_{jN_l \times jN_l}$ is the identity matrix having the size of $jN_l$.

Step S2.4: Receiving and Reflecting Wireless Signals by the Active Reflecting Elements of the IRS Receiving the wireless signals sent from the $N_t$ antennas, modifying the phase of the received wireless signals and reflecting their received wireless signals to the receiver by the active reflecting elements of the IRS respectively.

Step S2.5: Receiving the Reflected Wireless Signals and Obtaining a Received b Baseband Symbol Receiving the wireless signals reflected by the active reflecting elements of the IRS through the receiver, converting the received wireless signals to baseband to obtain a received baseband symbol $y_{m,j}$.

When the joint modulated symbol $s_{m,j}$ is transmitted, the received baseband symbol $y_{m,j}$ can be expressed as:

$$y_{m,j} = h_{sr} \Phi_j H_{ts} w b_m + z \quad (6)$$
$$= \rho \hat{h}_{sr} \Phi_j H_{ts} w b_m + \sqrt{1-\rho^2} \Delta h \Phi_j H_{ts} w b_m + z$$
$$= \rho g_j b_m + \sqrt{1-\rho^2} \Delta h g_j b_m + z$$

where w is the beamforming vector at the transmitter, z accounts for the additive white Gaussian noise (AWGN) as well as the interference at the receive antenna having the variance of $\sigma_a^2$, $\sigma_a^2$ is a noise variance, $g_j = \hat{h}_{sr} \Phi_j H_{ts} w$ and $g_j = \Phi H_{ts} w$.

Step S2.6: Demodulating the Baseband Symbol $y_{m,j}$ in Phase-Amplitude Domain and Reflective Domain by the Receiver In order to recover the joint modulated symbol $s_{m,j}$, a maximum likelihood (ML) detector is adopted for jointly demodulating the data information in both phase-amplitude domain and the reflective domain: finding a trial index m' in the set of [1, 2, . . . , M] and a trial index j' in the set of [1, 2, . . . , L] to make $|y_{m,j} - g_{j'} b_{m'}|^2$ minimal and taking the trial index m' as an estimated phase-amplitude modulation index $\overline{m}$ and the trial index j' as is an estimated reflective index $\overline{j}$, where the demodulation process is expressed as:

$$(\overline{m}, \overline{j}) = \arg \min_{\substack{m' \in [1,2,\ldots,M] \\ j' \in [1,2,\ldots,L]}} \left( |y_{m,j} - g_{j'} b_{m'}|^2 \right) \quad (7)$$

Where M is the modulation order of the phase-amplitude domain modulation, $g_{j'}$ is the channel gain under the j'-th IRS activating pattern, which can be obtained by channel estimation, $b_{m'}$ is the modulated baseband symbol of phase-amplitude modulation index m'.

Step S2.7: Recovering the Transmitted Data

Recovering the value of the reflective domain data $d_r$ according to the estimated reflective index $\bar{j}$ and the value of the value of the phase-amplitude domain data $d_r$ according to the estimated phase-amplitude modulation index $\bar{m}$ to recover the transmitted data.

Performance Analysis

In this section, we aim to analyze the bit error ratio (BER) performance of the RGNIM assisted system by adopting the ML detection approach.

A. Pairwise Error Probability

Firstly, we define a pairwise error probability (PEP) between two joint modulated symbols $s_{m,j}$ and $s_{n,i}$ (m≠n, i≠j) as $\tau(s_{m,j} \to s_{n,i})$, which is the probability that the Euclidean distance between the baseband symbol $y_{m,j}$ and the joint modulated symbol $s_{m,j}$, is larger than that between the baseband symbol $y_{m,j}$ and the joint modulated symbol $s_{n,i}$, when the joint modulated symbol $s_{m,j}$ is transmitted, the pairwise error probability $\tau(s_{m,j} \to s_{n,i})$ can be expressed as:

$$\tau(s_{m,j} \to s_{n,i}) = Pr\left[|y_{m,j} - g_j b_m|^2 > |y_{m,j} - g_i b_n|^2\right] = \quad (8)$$
$$Pr\left[\left|\sqrt{1-\rho^2}\Delta h g_j b_m + z + (\rho-1)g_j b_m\right|^2 > \left|\sqrt{1-\rho^2}\Delta h g_j b_m + z + \rho g_j b_m - g_i b_n\right|^2\right]$$

Where Pr is the abbreviation of probability. Since $\Delta h$ is a Gaussian distributed vector independent with the noise z, $\sqrt{1-\rho^2}\Delta h g_j b_m + z$ is also Gaussian distributed. Denoting $\Delta_{m,j} = \sqrt{1-\rho^2}\Delta h g_j b_m + z$, then $\Delta_{m,j} \sim \mathbb{CN}(0, \sigma_{m,j}^2)$, where $\sigma_{m,j}^2 = (1-\rho^2)\|g_j\|^2|b_m|^2\sigma_h^2 + \sigma_a^2$.

The pairwise error probability $\tau(s_{m,j} \to s_{n,i})$ can be further expressed as:

$$\tau(s_{m,j} \to s_{n,i}) = Pr\left[|\lambda_{m,j} + (\rho-1)g_j b_m|^2 > |\lambda_{m,j} + \rho g_j b_m - g_i b_n|^2\right] = \quad (9)$$
$$Pr\left[|2\mathcal{R}(\lambda_{m,j}(g_i b_n - g_j b_m)^*)|^2 > |\rho g_j b_m - g_i b_n|^2 - |(\rho-1)g_j b_m|^2\right]$$

Where $\mathcal{R}(x)$ represents the real part of the complex number x. According to the statistical characteristic of $\lambda_{m,j}$, the left-hand-side (LHS) of the above equation obeys a Gaussian distribution of $\mathcal{N}(0, |g_j b_m - g_i b_n|^2 \sigma_{m,j}^2/2)$, the above equation can be further expressed as:

$$\tau(s_{m,j} \to s_{n,i}) = Q\left(\frac{|\rho g_j b_m - g_i b_n|^2 - |(\rho-1)g_j b_m|^2}{|g_j b_m - g_i b_n|\sqrt{2\sigma_{m,j}^2}}\right) \quad (10)$$
$$\text{where } Q(x) = \int_x^{+\infty} \frac{1}{\sqrt{2\pi}} e^{\frac{t^2}{2}} dt.$$

Similarly, the PEP $\tau(s_{m,j} \to s_{m,i})$ between the joint modulated symbols $s_{m,j}$ and $s_{m,i}$ and the PEP $\tau(s_{m,j} \to s_{n,j})$ between the joint modulated symbols $s_{m,j}$ and $s_{n,j}$ are derived as:

$$\tau(s_{m,j} \to s_{m,i}) = Q\left(\frac{|b_m|(|\rho g_j - g_i|^2 - |(\rho-1)g_j|^2)}{|g_j - g_i|\sqrt{2\sigma_{m,j}^2}}\right) \quad (11)$$

$$\tau(s_{m,j} \to s_{n,j}) = Q\left(\frac{|g_j|(|\rho b_m - b_n|^2 - |(\rho-1)b_m|^2)}{|b_m - b_n|\sqrt{2\sigma_{m,j}^2}}\right) \quad (12)$$

B. BER Performance

Denoting the alphabetical set of the joint modulated symbols as $\mathcal{S} = \{s_{m,j} | m \in [1, 2, \ldots, M], j \in [1, 2, \ldots, L]\}$, the decoding BER at the receiver is expressed as:

$$\varepsilon = \frac{1}{kML}\sum_{s_{m,j} \in \mathcal{S}}\sum_{\substack{s_{n,i} \in \mathcal{S} \\ s_{m,j} \neq s_{n,i}}} d(s_{m,j}, s_{n,i})Pr(s_{m,j} \to s_{n,i}) \quad (13)$$

Where $k = k_r + k_c$, namely k is the number of the total bits transmitted in reflective domain and phase-amplitude domain in each transmission, $d(s_{m,j}, s_{n,i})$ represents the Hamming distance between the information bits carried by two joint modulated symbols $s_{m,j}$ and $s_{n,i}$, $Pr(s_{m,j} \to s_{n,i})$ represents the probability that the transmitted joint modulated symbol $s_{m,j}$ is mis-demodulated as $s_{n,i}$. When the signal noise ratio (SNR) is not very low, the mis-demodulation probability $Pr(s_{m,j} \to s_{n,i})$ can be approximated as the PEP $\tau(s_{m,j} \to s_{n,i})$. Therefore, the BER can be further approximated as:

$$\varepsilon = \frac{1}{k|\mathcal{S}|}\sum_{s_{m,j} \in \mathcal{S}}\sum_{\substack{s_{n,i} \in \mathcal{S} \\ s_{m,j} \neq s_{n,i}}} d(s_{m,j}, s_{n,i})\tau(s_{m,j} \to s_{n,i}) \quad (14)$$

The Hamming distance $d(s_{m,j}, s_{n,i})$ can be decomposed as $d(s_{m,j}, s_{n,i}) = d_c(s_{m,j}, s_{n,i}) + d_r(s_{m,j}, s_{n,i})$, where $d_c(s_{m,j}, s_{n,i})$ and $d_r(s_{m,j}, s_{n,i})$ are the Hamming distance between the information bits carried by $s_{m,j}$ and $s_{n,i}$ in phase-amplitude domain and reflective domain, respectively. Therefore, by decomposing the joint modulation scheme into two domains, we are able to obtain the BER in conventional phase-amplitude domain and the reflective domain as:

$$\varepsilon_c = \frac{1}{k_c|\mathcal{S}|}\sum_{s_{m,j} \in \mathcal{S}}\sum_{\substack{s_{n,i} \in \mathcal{S} \\ s_{m,j} \neq s_{n,i}}} d_c(s_{m,j}, s_{n,i})\tau(s_{m,j} \to s_{n,i}) \quad (15)$$

$$\varepsilon_r = \frac{1}{k_r|\mathcal{S}|}\sum_{s_{m,j} \in \mathcal{S}}\sum_{\substack{s_{n,i} \in \mathcal{S} \\ s_{m,j} \neq s_{n,i}}} d_r(s_{m,j}, s_{n,i})\tau(s_{m,j} \to s_{n,i}) \quad (16)$$

Optimizing the Phase Shifts of Reflecting Elements

In the IRS transmission system with traditional non-index modulation, the phase shifts of reflecting elements can be optimized by performing a joint phase compensation on two-hop channel to improve the QOS of the receiver and reduce the BER. However, In the IRS transmission system based on reflective index modulation, different state (active state or inactive state) of reflecting elements will affect the quality of the received signal, therefore, the BER of the receiver is not only related to the strength of the received signal, but also to the influence of reflective index in constellation. In consideration of different reflective index's corresponding state of reflecting elements, we hope to improve the communication performance of the IRS transmission system based on reflective index modulation through minimizing the bit error ratio (BER) shown in equation (14). Under the circumstance of high signal-to-noise ratio and accurate channel estimation (channel estimation accuracy parameter ρ approaches to 1), the BER shown in equation (14) can be further approximated as:

$$\varepsilon = \frac{1}{k|S|} \sum_{s_{m,j} \in S} \sum_{\substack{s_{n,i} \in S \\ s_{m,j} \neq s_{n,i}}} d(s_{m,j}, s_{n,i}) Q\left(\frac{|g_j b_m - g_i b_n|^2}{\sqrt{2\sigma_{m,j}^2}}\right) \quad (17)$$

The phase shifts of reflecting elements exist only in the above Q function, and the value of Q function decreases with the increase of variable value, therefore, minimizing the BER shown in equation (15) is equivalent to maximizing the minimal value of $|g_j b_m - g_i b_n|$, namely the Euclidean distance of two joint modulated symbols $s_{m,j}$ and $s_{n,i}$ at the receiver. The square of the Euclidean distance of two joint modulated symbols $s_{m,j}$ and $s_{n,i}$ at the receiver can be expressed as:

$$\mathcal{D}(s_{m,j}, s_{n,i}) = |g_j b_m - g_i b_n|^2 \quad (18)$$
$$= |\hat{h}_{sr} \Phi_j H_{ts} w b_m - \hat{h}_{sr} \Phi_i H_{ts} w b_n|^2$$
$$= |uA_j \xi b_m - uA_i \xi b_n|^2$$
$$= u R_{m,n,j,i} u^H$$

Where $u^H = \text{diag}(\Phi) = (u_1, u_2, \ldots, u_{N_s})$, $u_l = e^{j\theta_l}$, $l=1, 2, \ldots, N_s$, $\text{diag}(\Phi)$ represents turning the IRS phase shifter matrix $\Phi$ into a vector, $R_{m,n,j,i} = (A_j \xi b_m - A_i \xi b_n)(A_j \xi b_m - A_i \xi b_n)^H$, $\xi = \text{diag}(\hat{h}_{sr}) H_{ts} w$, $\text{diag}(\hat{h}_{sr})$ represents turning the vector $\hat{h}_{sr}$ into a diagonal matrix. Therefore, the optimization problem of the phase shifts of reflecting elements can be established as:

$$\max_{u} \min_{s_{m,j} \neq s_{n,i}} u R_{m,n,j,i} u^H \quad (19)$$
$$\text{s.t. } |u_l| = 1, l = 1, 2, \ldots, N_s$$

From the optimization problem of equation (19), we can see that the phase shift of reflecting element is related not only to the channel state information, but also to the joint modulated scheme. When the channels or the joint modulated scheme changes, the optimal u, namely the phase shifts of reflecting elements will change accordingly. Assuming that the channels are unchanged in a modulated symbol, we can solve the optimization problem of equation (19) in the time of the modulated symbol.

To solve the optimization problem of equation (19), we introduce a variable t and let $u^H u = U$, then $\text{rank}(U) = 1$ and $U R_{m,n,j,i} u^H = \text{tr}(R_{m,n,j,i} u^H u) = \text{tr}(R_{m,n,j,i} U)$, the optimization problem of equation (19) can be equivalent to:

$$\max_{t,u} t \quad (20)$$
$$\text{s.t. } \text{tr}(R_{m,n,j,i} U) \geq t, \forall s_{m,j}, s_{n,i} \in S, s_{m,j} \neq$$
$$s_{n,i}, U \succeq 0, \text{rank}(U) = 1 \text{ and } U_{l,l} = 1, l = 1, 2, \ldots, N_s$$

Where $U_{l,l}$ represents the element of the l-th row and l-th column of the matrix U.

However, the rank one constraint rank(U)=1 is non-convex, the optimization problem of equation (20) is still a non-convex problem. To solve the optimization problem of equation (20), a scale is needed, namely the rank one constraint rank(U)=1 needed to be discarded. Then a solution that satisfied with the constraints in the optimization problem of equation (20) can be founded by searching t with bisection algorithm, and the upper bound of the optimal value can be obtained. The process of optimizing can be expressed as:

$$\text{Find } U \quad (21)$$
$$\text{s.t. } \text{tr}(R_{m,n,j,i} U) \geq t, \forall s_{m,j}, s_{n,i} \in S, s_{m,j} \neq$$
$$s_{n,i}, U \succeq 0, \text{ and } U_{l,l} = 1, l = 1, 2, \ldots, N_s$$

When variable t is given, the optimization problem of equation (21) is a convex positive semidefinite program and can be solved by a traditional optimizer. In addition, when the given variable t can make optimization problem of equation (21) solvable, it shows that t≤t*, when the given variable t can't make optimization problem of equation (21) solvable, it shows that t>t*. Through continuously searching t with bisection algorithm, the optimal value t* and the optimal value U* of the optimization problem of equation (20) can be obtained. When the optimal value U* satisfies with rank(U*)=1, the optimal value t* and the optimal value U* are optimal solution of the optimization problem of equation (20). When rank(U*)>1, the optimal value t* is the lower bound of the optimal value of equation (20).

To recover an optimal vector u*, Gaussian randomization can be used to obtain an approximate vector u. More specifically, the Gaussian randomization comprises the following steps: performing an eigenvalue decomposition U*=VΣV$^H$ on the optimal value U*, where V is a unitary matrix composed of eigenvectors of the optimal value U*, Σ is a diagonal matrix composed of eigenvectors of the optimal value U*, then letting u*=VΣ$^{1/2}$r, where r is a random vector in which each element obeys Gaussian distribution.

After obtaining the approximate vector u*, we can obtain optimized phase shifts $\theta_l^*$, $l=1, 2, \ldots, N_s$ of reflecting elements according to the following equation:

$$\text{diag}(u^{*H}) = (u_1^*, u_2^*, \ldots, u_{N_s}^*) \quad (22)$$
$$\text{where } u_l^* = e^{j\theta_l^*}.$$

Simulation

A. Parameter Setting

In this section, the BER performance of the present invention is evaluated by the MATLAB aided simulation. The transmitter is equipped with $N_t=4$ antennas, while the number of the IRS reflecting elements is set to $N_s=64$. Each element $H_{i,j} \in H_{ts}$ satisfies $H_{i,j} \sim \mathcal{CN}(0, d_{ts}^{-\alpha})$, and $h_i \in h_{sr}$ satisfies $h_i \sim \mathcal{CN}(0, d_{sr}^{-\alpha})$, where $d_{ts}$ and $d_{sr}$ are the distance between the transmitter and the IRS and the distance between the IRS and the receiver, respectively. The power of the additive white Gaussian noise (AWGN) and the interference is set to $\sigma_a^2 = -50$ dBm. The transmit beamforming vector is set as $$w = \frac{1}{\sqrt{N_t}} * [1, 1, \ldots, 1],$$

while the magnitude reflection coefficient of the IRS is set to $\beta_1=\beta_2=\ldots=\beta_{N_s}=1$. In order to ensure that multiple reflected wireless signal from the IRS can be superimposed positively, the phase shift $\theta_i$ is set to:

$$\theta_i = -\angle\left(\sum_{j=1}^{N_t} H_{ts,i,j} w_j\right) - \angle\hat{h}_{sr,i} \quad (23)$$

Where $H_{ts,i,j}$ represents the element at the i-th row and the j-th column in $H_{ts}$, $\hat{h}_{sr,i}$ represents the element at the i-th column in $\hat{h}_{sr}$, where as $\angle x$ denotes the phase of the complex number x. Without specific statement, the channel estimation accuracy parameter is set to $\rho=0.99$.

B. Numerical Results

Figure 3:
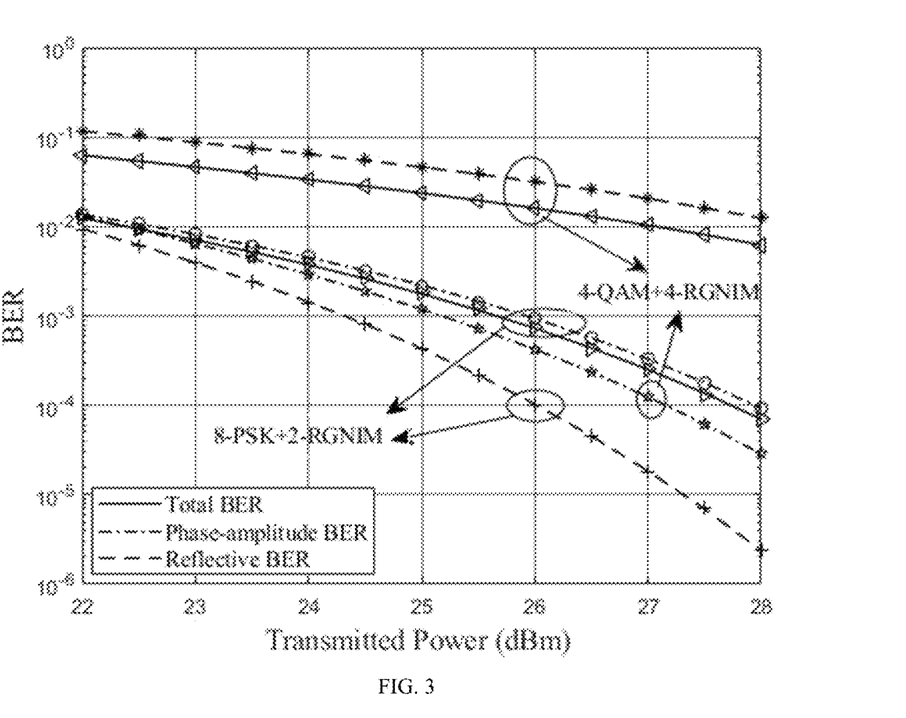
FIG. 3 is a diagram of curves for validation of theoretical analysis of BER.

The theoretical BER analysis of the present invention is validated in FIG. 3, the lines are theoretical results and the dots are simulation results, where the 4-QAM and 8-PSK conventional modulation schemes are conceived by jointly considering 4-RGNIM and 2-RGNIM modulation schemes, respectively. The data rate is k=4 bit/channel use. The simulation results are obtained by the Monte Carlo based simulation, where there are totally $10^8$ information bits transmitted to the receiver. Observe from FIG. 3 that the theoretical results of the total BER E, the phase-amplitude BER $\varepsilon_c$ and the reflective BER $\varepsilon_r$ match well with the simulation results. Therefore, in order to reduce the complexity, the theoretical results are used to evaluate the BER performance of RGNIM assisted system in the latter simulations. Moreover, the BER of the 8-PSK+2-RGNIM scheme outperforms that of the 4-QAM+4-RGNIM scheme. Especially, a lower order of the phase-amplitude modulation scheme results in a lower phase-amplitude BER, while a lower order of the reflective modulation scheme results in a lower reflective BER.

Figure 4:
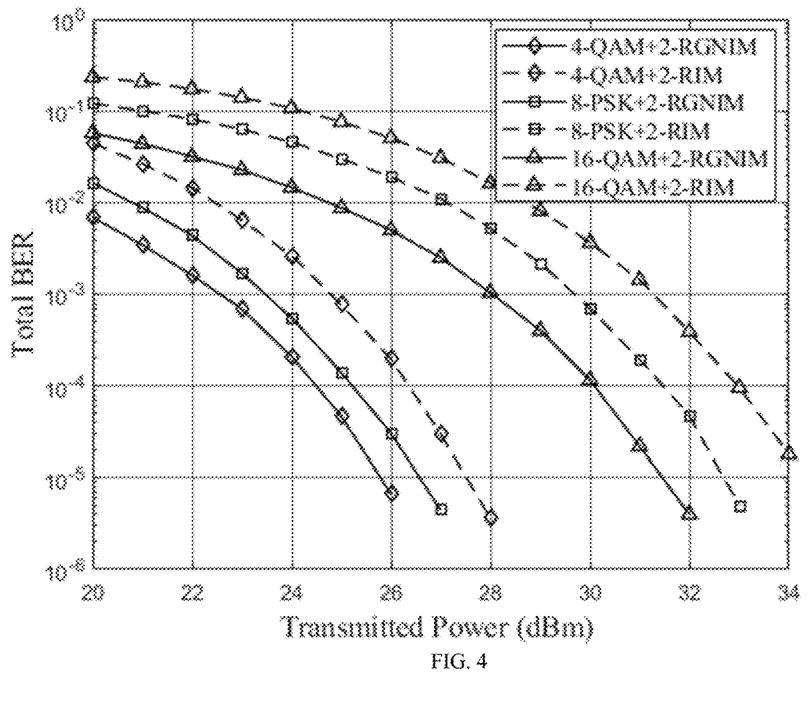
FIG. 4 is a diagram of curves for total BER comparison of RGNIM.

FIG. 4 compares the total BER performance between our RGNIM scheme and the RIM scheme, in which different (L−1) groups of IRS elements are activated for modulating various reflective information. The 4-QAM, 8-PSK and 16-QAM conventional modulation schemes are conceived by jointly considering 2-RGNIM modulation schemes. Observe from FIG. 4 that our RGNIM outperforms the RIM. Moreover, a higher data rate results in a higher BER, since the Euclidean distance between two adjacent joint modulated symbols are smaller.

Figure 5:
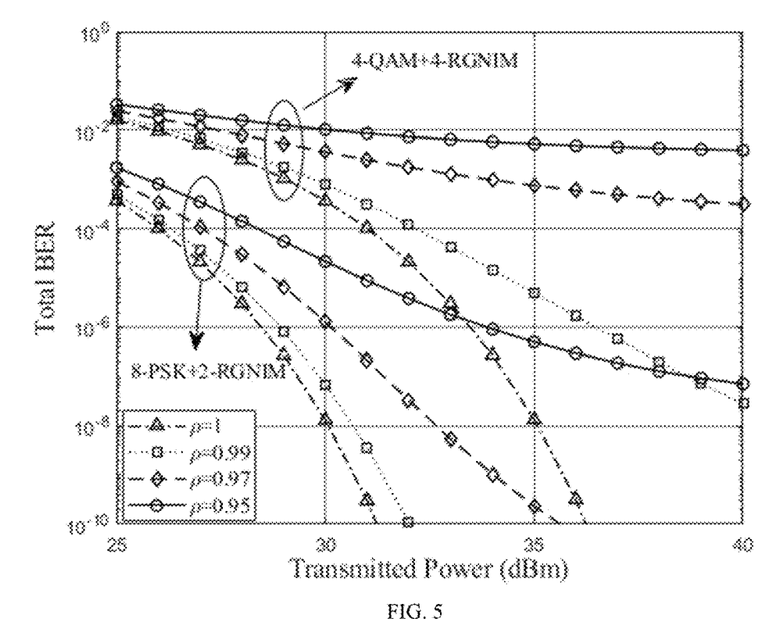
FIG. 5 is a diagram of curves for impact of imperfect channel estimation on total BER of the present invention.

FIG. 5 evaluates the impact of the imperfect channel estimation on the total BER of the RGNIM assisted system, where the 4-QAM+4-RGNIM and the 8-PSK+2-RGNIM joint modulation schemes are conceived. Observe from FIG. 5 that a smaller channel estimation parameter p results in a higher total BER for both the schemes. This is because that when channel estimation parameter p becomes smaller, the channel estimation error becomes larger, which has more influence on the joint demodulation and then reduces the correctness. When we continually increase the transmit power, the total BER with imperfect CSI gradually becomes flat, since the channel estimation error dominates interference and the noise. Note that when $\rho=1$, the CSI is perfectly estimated, which results in the lowest BER.

While illustrative embodiments of the invention have been described above, it is, of course, understand that various modifications will be apparent to those of ordinary skill in the art. Such modifications are within the spirit and scope of the invention, which is limited and defined only by the appended claims.

What is claimed is:

1. A method for reflective index modulation based on intelligent reflecting surface (hereinafter referred by IRS) is provided, comprising the following steps:

(1) creating an IRS-assisted wireless communication system, wherein the IRS-assisted wireless communication system comprises a transmitter, a receiver, an IRS and an IRS control unit, the transmitter is equipped with $N_t$ antennas, the receiver is equipped with a single antenna due to the limitation of its hardware size, the IRS comprises $N_s$ reflecting elements, and the $N_s$ reflecting elements are divided into L groups, $L \leq \log_2 N_s$, each group has $N_s/L$ reflecting elements, each reflecting element can modify the phase of received wireless signal and can be switched between active state and inactive state by the IRS control unit;

(2) transmitting data through reflective index modulation:

2.1) dividing the data to be transmitted in a transmission into two parts: a reflective domain data $d_r$ and a phase-amplitude domain data $d_c$, then transmitting the reflective domain data $d_r$ to the IRS control unit through a wired connection by the transmitter;

2.2) performing a reflective domain modulation by the IRS control unit: converting the received reflective domain data $d_r$ into a reflective index j, where $1 \leq j \leq L$ and j corresponds to the value of the reflective domain data $d_r$, then denoting the j-th IRS activating pattern as an indicator $a_j=[a_{j,1}, a_{j,2}, \ldots, a_{j,L}]$, where $a_{j,l}=1$, when $1 \leq l \leq j$, $a_{j,l}=0$, when $j < l \leq L$, then activating or deactivating each group of reflecting elements according to the value of $a_{j,l}$: if $a_{j,l}=1$, then activating the l-th group of reflecting elements to turn them into active state, if $a_{j,l}=0$, then deactivating the l-th group of reflecting elements to turn them into inactive state;

2.3) performing a phase-amplitude domain modulation for the phase-amplitude domain data $d_c$ by the transmitter to obtain a modulated baseband symbol $b_m$, where m is a phase-amplitude modulation index and corresponds to the value of the phase-amplitude domain data $d_c$, then upconverting the modulated baseband symbol $b_m$ into a wireless signal and transmitting the wireless signal to the IRS through the $N_t$ antennas of the transmitter;

2.4) receiving the wireless signals sent from the $N_t$ antennas, modifying the phase of the received wireless signals and reflecting their received wireless signals to the receiver by the active reflecting elements of the IRS respectively;

2.5) receiving the wireless signals reflected by the active reflecting elements of the IRS through the receiver, converting the received wireless signals to baseband to obtain a received baseband symbol $y_{m,j}$;

2.6) demodulating the baseband symbol $y_{m,j}$ in phase-amplitude domain and reflective domain: finding a trial index m' in the set of $[1, 2, \ldots, M]$ and a trial index j' in the set of $[1, 2, \ldots, L]$ to make $|y_{m,j}-g_{j'}b_{m'}|^2$ minimal and taking the trial index m' as an estimated phase-amplitude modulation index $\bar{m}$ and the trial index j' as is an estimated reflective index $\bar{j}$, where the demodulation process is expressed as:

$$(\overline{m}, \overline{\jmath}) = \arg \min_{\substack{m' \in [1,2,\ldots,M] \\ j' \in [1,2,\ldots,L]}} \left( |y_{m,j} - g_{j'} b_{m'}|^2 \right)$$

where M is the modulation order of the phase-amplitude domain modulation, $g_{j'}$ is the channel gain under the j'-th IRS activating pattern, which can be obtained by channel estimation, $b_{m'}$ is the modulated baseband symbol of phase-amplitude modulation index m';

2.7) recovering the value of the reflective domain data $d_r$ according to the estimated reflective index $\overline{\jmath}$ and the value of the phase-amplitude domain data $d_c$ according to the estimated phase-amplitude modulation index $\overline{m}$ to recover the transmitted data.

2. A method for reflective index modulation based on intelligent reflecting surface according to claim 1, wherein the phase shifts of reflecting elements are optimized according to following steps:

3.1) letting $u^H = \text{diag}(\Phi) = (u_1, u_2, \ldots, u_{N_s})$ and $u^H u = U$, where $u_l = \beta_l e^{j\theta_l}$, $l=1, 2, \ldots, N_s$, $\text{diag}(\Phi)$ represents turning the IRS phase shifter matrix $\Phi$ into a vector;

3.2) letting $R_{m,n,j,i} = (A_j \xi b_m - A_i \xi b_n)(A_j \xi b_m - A_i \xi b_n)^H$, $\xi = \text{diag}(\hat{h}_{sr}) H_{ts} w$, where:

$$A_j = \begin{bmatrix} I_{jN_l \times jN_l} & 0_{jN_l \times (L-j)N_l} \\ 0_{jN_l \times (L-j)N_l} & 0_{(L-j)N_l \times (L-j)N_l} \end{bmatrix} \quad A_i = \begin{bmatrix} I_{iN_l \times iN_l} & 0_{iN_l \times (L-i)N_l} \\ 0_{iN_l \times (L-i)N_l} & 0_{(L-i)N_l \times (L-i)N_l} \end{bmatrix}$$

$\hat{h}_{sr}$ represents the estimated CSI between the IRS and the receiver, $\text{diag}(\hat{h}_{sr})$ represents turning the vector $\hat{h}_{sr}$ into a diagonal matrix, $H_{ts}$ is the channel state information (CSI) between the transmitter and the IRS, w is the beamforming vector at the transmitter;

3.3) solving optimization problem:

Find U s.t. $\text{tr}(R_{m,n,j,i} U) \geq t$, $\forall s_{m,j}$, $s_{n,i} \in \mathcal{S}$, $s_{m,j} \neq s_{n,i}$, $U \succeq 0$, and $U_{l,l} = 1$, $l=1, 2, \ldots, N_s$ where t is an introduced variable, $s_{m,j}$ is a joint modulated symbol of the modulated baseband symbol $b_m$ with the j-th IRS activating pattern, $s_{n,i}$ is a joint modulated symbol of the modulated baseband symbol $b_n$ with the i-th IRS activating pattern, $\mathcal{S} = \{s_{m,j} | m \in [1, 2, \ldots, M], j \in [1, 2, \ldots, L]\}$, $U \succeq 0$ represents U is positive semidefinite matrix, $U_{l,l}$ represents the element of the l-th row and l-th column of matrix U, through continuously searching t with bisection algorithm, the optimal value U* of the optimization problem is obtained;

3.3) recovering an optimal vector u*: performing an eigenvalue decomposition $U^* = V \Sigma V^H$ on the optimal value U*, where V is a unitary matrix composed of eigenvectors of the optimal value U*, $\Sigma$ is a diagonal matrix composed of eigenvectors of the optimal value U*, then letting $u^* = V \Sigma^{1/2} r$, where r is a random vector in which each element obeys Gaussian distribution;

3.4) obtaining optimized phase shifts $\theta_l^*$, $l=1, 2, \ldots, N_s$ of reflecting elements according to the following equation:

$$\text{diag}(u^{*H}) = (u^{1*}, u^{2*}, \ldots, u_{N_s}^*)$$

where $u_l^* = e^{j\theta_l^*}$.

* * * * *